M. MANSOR.
ICE CREAM CAN COVER.
APPLICATION FILED MAR. 31, 1910.
971,290.
Patented Sept. 27, 1910.
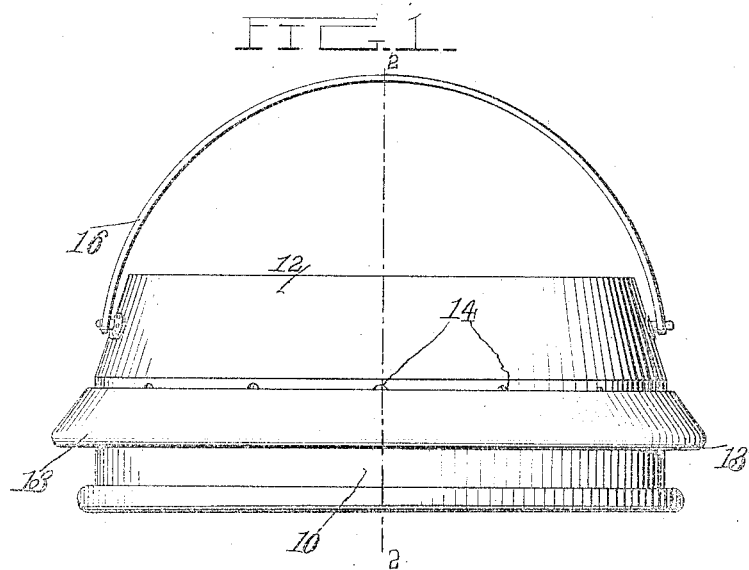
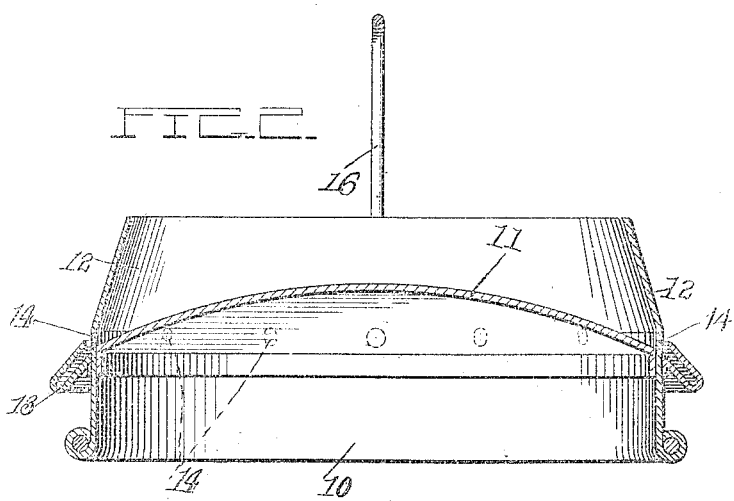
Inventor
Massoud Mansor.
Witnesses
By
Attorneys

UNITED STATES PATENT OFFICE.

MASSOUD MANSOR, OF ORRVILLE, OHIO.

ICE-CREAM-CAN COVER.

971,290.

Specification of Letters Patent. Patented Sept. 27, 1910.

Application filed March 31, 1910. Serial No. 552,646.

*To all whom it may concern:*

Be it known that I, MASSOUD MANSOR, a citizen of the United States, residing at Orrville, in the county of Wayne, State of Ohio, have invented certain new and useful Improvements in Ice-Cream-Can Covers; and I do hereby declare the following to be a full, clear, and exact description of the invention, such as will enable others skilled in the art to which it appertains to make and use the same.

This invention relates to ice cream freezers and has special reference to an improved cover for devices of this description.

It is a well understood fact that the ordinary ice cream freezer is provided with a cover which is substantially flat and that when ice cream is packed, after the stirring process, it is advisable to cover the cover of the freezer with the freezing mixture as well as to pack the sides. When this is done in the ordinary manner it becomes necessary every time the cover is removed for serving cream to remove the ice from the cover, and inasmuch as the particles of ice are difficult to remove it frequently happens that some of the ice and salt drop into the freezer as the cover is taken off.

The principal object of the present invention is to provide a novel form of cover for the cans of ice cream freezers which may be permanently packed with a freezing mixture and which is so constructed that the mixture used in packing the cover will be prevented from dripping into the ice cream as the cover is removed.

With the above and other objects in view, the invention consists in general of an improved form of cover provided with a receptacle for a freezing mixture and a receptacle for the melted water from such a mixture in communication with the first mentioned receptacle.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a side elevation of a freezer cover constructed in accordance with this invention. Fig. 2 is a section on the line 2—2 of Fig. 1.

This cover comprises a cylindrical portion 10 adapted to fit around the mouth of the ordinary ice cream can and this cylindrical portion is provided with a cap or closure portion 11 in the form of an upwardly concaved diaphragm. Extending above this closure 11 is an annular flange 12 tapering inward so as to form a frusto-conical receptacle having a convex bottom, this being clearly shown in Fig. 2. Extending around the cylindrical portion 10 on the outside thereof is a trough member 13 U-shaped in cross section and open at the upper end. Through the flange 12 are formed openings 14 which are arranged adjacent the lower edge of the flange so that any liquid escaping from the receptacle above the closure 11 will fall into the trough.

In order to handle the cover and to make a convenient means of removing the same a bail 16 is provided which is pivoted to the cover so that it may fall on either side after the fashion of the ordinary bucket or pail handle.

In the use of this device the receptacle formed by the members 11 and 12 is filled with some such freezing mixture as ice and salt and the cover placed on the can. Any melting of the contents of the receptacle which forms water will result in the water thus formed running downward to the outer edges of the receptacle, this being provided for by the peculiar shape of the bottom formed by the closure 11. As this water runs down to these outer edges it passes out through the openings 14 and into the annular trough. By reason of this the cover may be lifted off the can without disturbing the contents of the receptacle and without danger of spilling any ice or salt into the cream, since the trough will receive any of the melted contents while the receptacle itself will hold the solid contents. The receptacle can thus be used an indefinite number of times without requiring repacking, it being simply necessary, when the trough is nearly full, to tilt the cover up on one edge after removal from the can so that the contents of the trough are poured out.

There has thus been provided a simple and efficient device of the kind described and for the purpose specified.

Having thus described the invention, what is claimed as new, is:—

In a can cover, a flange adapted to fit over the mouth of a can, an upwardly concaved closure covering the space surrounded by said flange, an inwardly inclined flange extending upwardly around the periphery of said closure to form a frusto-conical receptacle having a convex bottom, said second flange being provided with a series of perforations around the lower edge thereof, an annular trough extending around the outside of the first mentioned flange immediately below the perforations in the second flange, and a bail pivoted on said cover.

In testimony whereof, I affix my signature, in presence of two witnesses.

MASSOUD MANSOR.

Witnesses:
 JOHN LEIES,
 LEVI BRENNEMAN.